May 18, 1948.  J. BROGGI  2,441,751
GAS TURBINE PLANT
Filed May 13, 1946
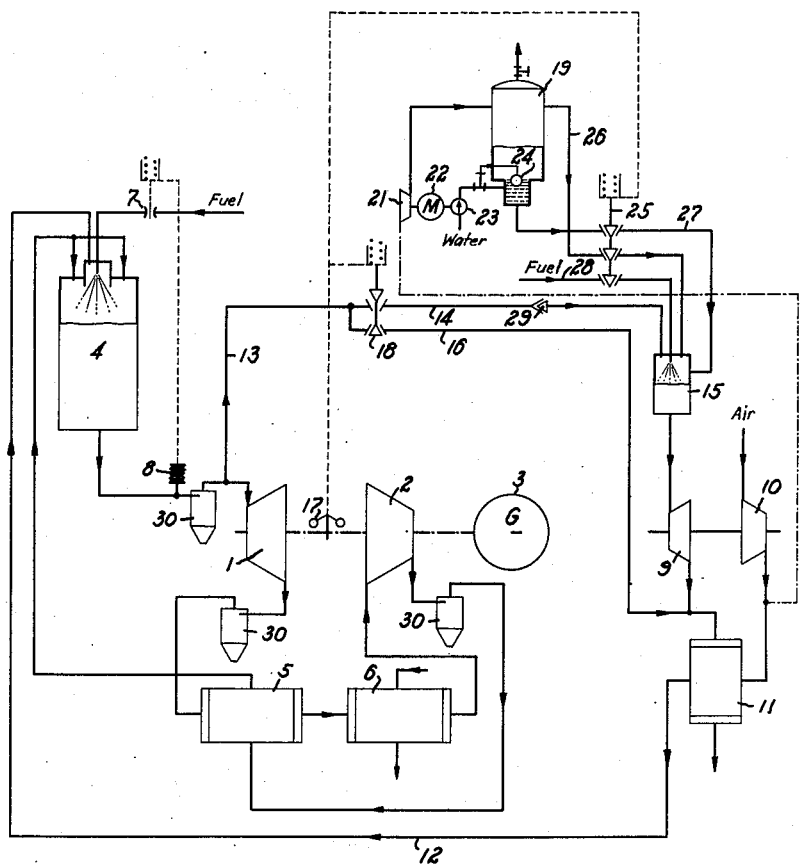
Inventor:
Josef Broggi.
By Pierce & Scheffler
Attorneys Patented May 18, 1948

2,441,751

UNITED STATES PATENT OFFICE 2,441,751

GAS TURBINE PLANT

Josef Broggi, Baden, Switzerland, assignor to Aktiengesellschaft Brown, Boveri & Cie, Baden, Switzerland, a joint-stock company Application May 13, 1946, Serial No. 669,278
In Switzerland May 22, 1945

5 Claims. (Cl. 60—41)

This invention relates to gas turbine plants and more particularly to gas turbine plants which operate according to a novel combination of the "open circuit" and "closed circuit" processes:

In the open circuit process of operation, the compressor draws air from atmosphere and delivers it to the combustion chamber in which fuel is burned to develop the combustion gases for driving the turbine. The hot combustion gases are expanded in the turbine, and then exhausted to atmosphere. In the closed circuit process, the gas for operating the turbine, usually pure air, is compressed and forced through a heat exchanger, expanded in the turbine, and then cooled before it is returned to the compressor. The most important advantage of the open circuit process is the elimination of the heating and cooling surfaces, and of the cooling agent, which are required in the closed circuit process, and an advantage of the latter process is that solid fuels may be employed without introducing solid residues of combustion into the circulating pressure medium.

The basic apparatus assembly for operation according to both processes comprises a compressor, a turbine and a driven device, for example an alternating current generator, on a common shaft. The generator must be driven at substantially constant speed and, since it is usually desirable to maintain a substantially constant temperature at the inlet to the turbine, the preferred method of regulation of the developed power to carry a varying load is by a control of the pressure of the power gas at the turbine inlet. This regulation is readily attained when operating on the closed circuit process by introducing more air into the circuit by an auxiliary compressor or from a pressure tank upon an increase in load, and by venting air from the circuit upon a decrease in load.

Prior proposals for gas turbine plants for operation on combinations of open circuit and closed circuit processes have not been entirely satisfactory for a number of reasons. In general, the regulation of the speed of the power turbine was relatively slow under varying loads and was unstable in some instances under abrupt changes in the load. Some of the prior proposals were unsatisfactory as the purported advantages were offset by the large and expensive heat transfer surfaces required in the heater and the cooler of the closed circuit section of the apparatus.

Objects of the present invention are to provide gas turbine plants which combine the better features and advantages of the open circuit and the closed circuit methods of operation. Objects are to provide gas turbine plants of the automatically regulated type which are stable in operation under varying loads and which respond quickly to changes in the load level. An object is to provide a gas turbine plant including a power turbine assembly operating on a modified closed circuit process, an auxiliary or charging turbine assembly for supplying fresh air to the circulating system of the power turbine assembly, and a regulating system for varying the speed of the charging turbine assembly to control the quantity of fresh air introduced into the circulating gas stream in accordance with variations in the load. More specifically, an object is to provide a gas turbine plant of the type stated in which the variable power input to the charging turbine assembly does not impose a varying load upon the power turbine.

These and other objects and advantages of the invention will be apparent from the following specification when taken with the accompanying drawing in which the single view is a schematic illustration of a gas turbine plant embodying the invention.

In the drawing, the reference numeral 1 identifies the main or power turbine which drives a compressor 2 and a load 3 which is to be operated at a substantial speed, for example an alternating current generator. The pressure gas system of this power turbine assembly is of a modified closed circuit type as the major part of the combustion gases developed in a main combustion chamber 4 flow through the turbine 1 and compressor, and then back to the combustion chamber. The exhaust gases from the turbine are cooled down by passage through a recuperator 5 and cooler 6 before entering the compressor 2, and the compressed gases from the compressor are reheated in the recuperator 5 on the way back to the combustion chamber 4. The temperature of the gases at the inlet to the turbine 1 is maintained substantially constant through a regulation of valve 7 in the fuel supply line by a thermostatic device 8 in the pressure gas conduit which connects the combustion chamber 4 to the turbine 1.

Fresh air is supplied under pressure to the closed gas circuit by a charging turbine system comprising a turbine 9 and a compressor 10, the compressed air being heated by the exhaust gases in a heat exchanger 11. The compressed air conduit 12 opens into the main combustion chamber 4 adjacent or around the fuel spray, and the hot combustion gases are cooled down by the comparatively cold circulating gases which are delivered to the combustion chamber 4 by the compressor 2 of the power turbine assembly. Excess gases are withdrawn through a conduit 13 which branches from the closed circuit at a point between the combustion chamber 4 and the turbine 1, and a portion of the excess gases flow to the charging turbine 9 through a conduit 14 and auxiliary combustion chamber 15, while the remainder is vented to atmosphere through a conduit 16 and the heat exchanger 11.

The charging turbine assembly operates at variable speed under control of a speed responsive device 17, such as a ball governor, actuated by the shaft of the power turbine assembly. For slow changes in the load on the generator 3, the regulation is effected by a double valve 18 in conduits 14, 16 which varies the quantity of pressure gas delivered to the charging turbine 9 through the conduit 14. The turbine speed, and thereby the quantity of combustion air delivered by the charging compressor 10, varies with the pressure gas input to turbine 9 through the conduit 14. The pressure at the inlet to the power turbine 1 thus varies in accordance with the rate at which combustion air is delivered to the combustion chamber by the charging turbine assembly, and the effective power output of turbine 1 is thereby varied to drive the generator 3 at substantially constant speed.

Additional regulating equipment is required however to effect a rapid readjustment of the effective power output of turbine 1 in the event of sudden changes in the load. It is an important feature of this invention that the regulating equipment which compensates for sudden or shock variations in the load does not impose a secondary shock load upon the power turbine assembly. On the contrary, a variable power input to the charging turbine 9 is drawn from an auxiliary power source and not from the closed pressure gas circuit which supplies power to the main turbine 1.

As shown diagrammatically, this auxiliary power source is a pressure tank 19 into which air is forced under high pressure by a conduit 20 from the outlet side of compressor 10 and a booster compressor 21 which is driven by a motor 22. The motor also drives a water pump 23 to maintain a constant water level in the tank under control of a float 24.

A triple valve 25 with sections in the air line 26 and water line 27 from pressure tank 19 to the combustion chamber 15, and in the fuel line 28 to the chamber, is controlled by the speed responsive device 17. The particular mechanism for controlling the proportioning valve 18 and the triple valve 25 from the speed responsive device forms no part of the present invention, and, as indicated schematically, a hydraulic coupling may be used. The pressure in tank 19 may be substantially higher than the gas pressure at the inlet to the turbine 1 and a check valve 29 is arranged in the conduit 14 to permit a rise in the pressure within the auxiliary combustion chamber 15 without a backwards transfer of pressure to the main combustion chamber 4.

A sudden increase in the load results in a drop in the speed of the main turbine assembly, and the governor 17 opens the valve 25 to introduce high pressure air, fuel and water into the auxiliary combustion chamber 15. The sudden increase in the volume and pressure of the gas supply to the charging turbine 9 results in a rapid increase in volume of the compressed air output of the compressor 10. There is no tendency towards instability or "pumping" as the increased output is readily taken by the main combustion chamber 4 and turbine 1 with only a slight rise in pressure. The increased volume of combustion air supplied by the charging compressor tends to lower the temperature of the combustion gases, and the thermostatic device 8 opens the fuel valve 7 somewhat wider to maintain a substantially constant temperature at the inlet to the turbine 1.

The power input to the main turbine 1 increases rapidly and the speed of the main turbine assembly is restored to normal, the valve 25 then closing to a greater or less extent at the new balance between the generated power and the increased load. Upon a decrease in the load, the governor 17 actuates the double valve 18 to reduce the volume of gas delivered to the charging turbine 9 through the conduit 14 and to vent the excess gas to atmosphere through the conduit 16 and heat exchanger 11. The pressure level in the closed circuit goes down with the decreased speed of the charging compressor 10, and the temperature of the combustion gases tends to rise. The thermostatic device 8 throttles the fuel input to the main combustion chamber 4 to hold the combustion gas temperature within desired limits. An adjustment of the generated power to the new load value is quickly reached, and the fuel valve 7 and double valve 18 assume new balance positions corresponding to the fuel and air requirements for stable operation at the new load value.

The diagrammatic illustration of an embodiment of the invention has been simplified by the omission of various details which will be, or may be, incorporated in a commercial installation. For example, the compression of the pressure gases or air may be carried out with intermediate cooling, and the expansion of the pressure gases may be effected with intermediate or inter-stage heating. Solid residues of combustion may be entrained in the gas stream of the closed pressure gas circuit, and it is therefore desirable to arrange dust separators 30, of an electrostatic or a centrifugal separator type in the closed circuit system.

I claim:

1. In a gas turbine plant, the combination with a power turbine assembly comprising a power turbine driving a compressor and a load device, a main combustion chamber, means for supplying fuel to said combustion chamber, conduits connecting the combustion chamber to the power turbine and compressor in a closed pressure gas circuit, a charging turbine assembly comprising a charging turbine driving a charging compressor having an inlet open to atmosphere, a conduit connecting the charging turbine outlet to said main combustion chamber to supply combustion air to said closed pressure gas circuit, conduit means opening out of said closed pressure gas circuit at a point between the combustion chamber and the power turbine to discharge pressure gas from the closed circuit, said conduit means including a branch leading to atmosphere and a branch leading to the inlet of said charging turbine, and a speed responsive device driven by said power turbine, of regulating means actuated by said speed responsive device; said regulating means including valve means for adjusting the relative volume of gas flowing in the respective branches of said conduit means, and power means controlled by said speed responsive device upon a load increase to develop in said branch leading to the charging turbine pressure gases additional to those withdrawn from the closed pressure gas circuit of the power turbine assembly.

2. In a gas turbine plant, the invention as recited in claim 1, wherein said power means comprises an auxiliary combustion chamber in the branch leading to said charging turbine, a fuel supply line for said auxiliary combustion chamber, and valve means in said fuel supply line controlled by said speed responsive device.

3. In a gas turbine plant, the invention as recited in claim 1, wherein said power means comprises an auxiliary combustion chamber in the branch leading to said charging turbine, a pressure tank and means for delivering pressure air thereto, an air line connecting said pressure tank to said auxiliary combustion chamber, a fuel supply line for said auxiliary combustion chamber, and valve means in said fuel supply line and said air line controlled by said speed responsive device.

4. In a gas turbine plant, the invention as recited in claim 1, wherein said power means comprises an auxiliary combustion chamber in the branch leading to said charging turbine, a pressure tank and means for delivering compressed air and water thereto, air and water lines connecting said pressure tank to said auxiliary combustion chamber, a fuel line to said auxiliary combustion chamber, and valve means in the several lines controlled by said speed responsive device.

5. In a gas turbine plant, the invention recited in claim 1, in combination with an adjustable valve for regulating the quantity of fuel supplied to said main combustion chamber, and means responsive to the temperature of the pressure gases at the inlet side of said power turbine for adjusting said valve to vary the fuel supply to maintain a substantially constant temperature at the turbine inlet.

JOSEF BROGGI.